United States Patent [19]
Nakano

[11] Patent Number: 5,745,174
[45] Date of Patent: Apr. 28, 1998

[54] VIEWPOINT DETECTION APPARATUS WITH SELECTED CORRECTION COEFFICENT GENERATION

[75] Inventor: Hirofumi Nakano, Yokohama, Japan

[73] Assignee: Canon Kabushiki Kaisha, Tokyo, Japan

[21] Appl. No.: 418,467

[22] Filed: Apr. 7, 1995

[51] Int. Cl.⁶ .................................................. H04N 5/232
[52] U.S. Cl. .................................... 348/333; 396/51
[58] Field of Search .................................. 348/333, 334, 348/207; 396/373, 374, 51; H04N 5/232

[56] References Cited

U.S. PATENT DOCUMENTS 5,260,734  11/1993  Shindo .................................. 396/51
5,335,035  8/1994  Maeda .................................. 396/51
5,576,796  11/1996  Akashi .................................. 396/51

*Primary Examiner*—Wendy Garber
*Attorney, Agent, or Firm*—Fitzpatrick, Cella, Harper & Scinto

[57] ABSTRACT

A viewpoint detection apparatus includes a viewpoint detection unit for detecting the viewpoint of an operator on a display screen, a correction circuit for detecting and correcting any deviation between the actual viewpoint position of the operator and the viewpoint position detected by the viewpoint detection unit, and a storage circuit for storing correction information which is generated by the correction circuit and used for correcting the deviation. The apparatus has a mode of correcting the deviation based on the correction information stored in the storage circuit, and a mode of correcting the deviation by a calculation in the correction circuit without using the correction information.

8 Claims, 13 Drawing Sheets

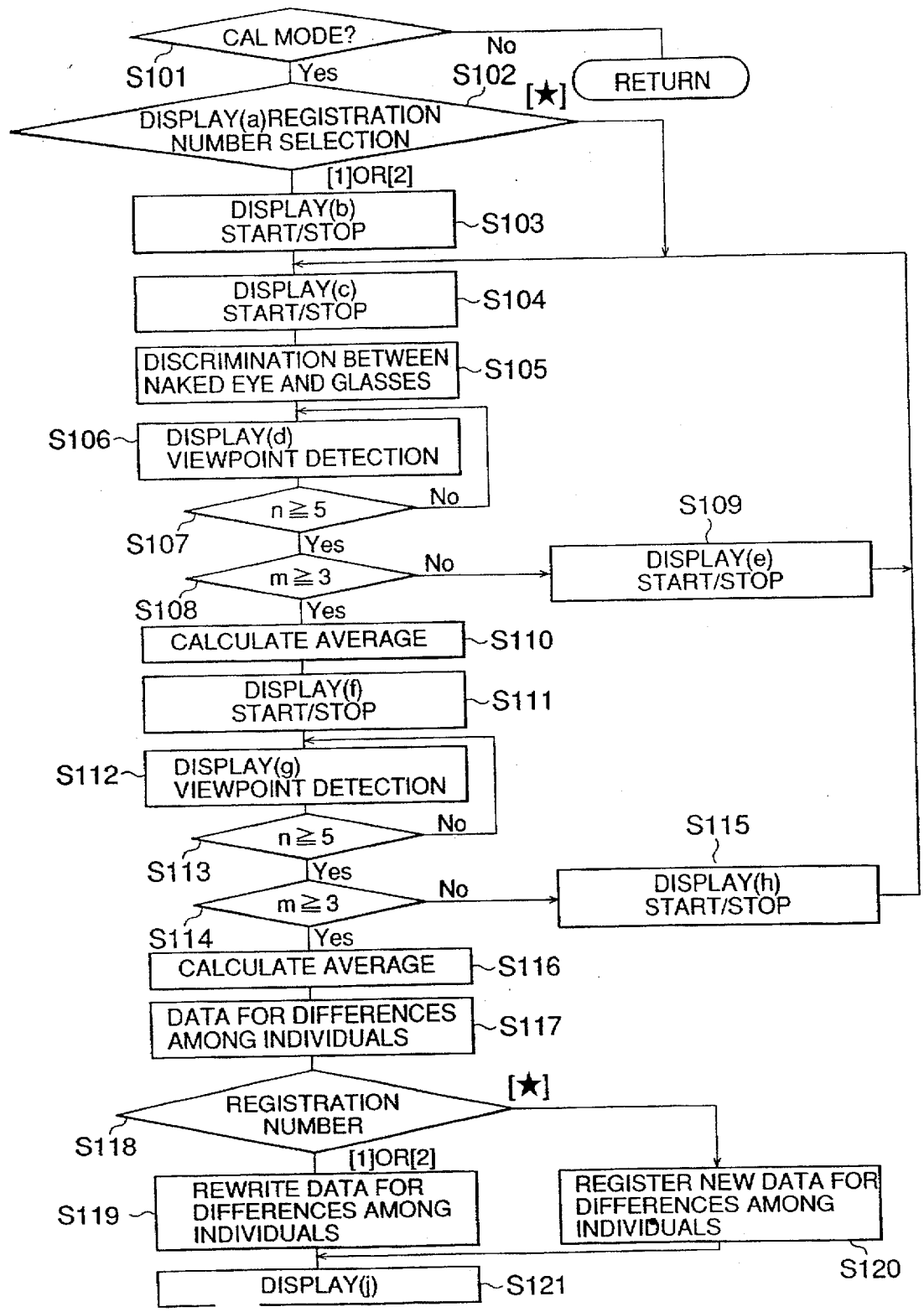

VIEWPOINT DETECTION APPARATUS WITH SELECTED CORRECTION COEFFICENT GENERATION

BACKGROUND OF THE INVENTION

1. Field of the Invention

The present invention relates to a viewpoint detection apparatus suitable for, e.g., a video camera.

2. Related Background Art

A viewpoint detection apparatus, which comprises means for correcting a deviation between the visual axis and the viewpoint of an observer, has already been proposed in, e.g., Japanese Patent Application No. 4-262750. The technique proposed in this reference describes means for correcting a deviation between the visual axis and viewpoint of an observer, and means for calculating information (data for differences among individuals) for the correction means on the basis of the eyeball rotation angle, the pupil diameter, and the like, and registering the information in a camera (to be referred to as a calibration hereinafter).

Especially, as described in this reference, since data for differences among individuals can be rewritten when a single user repetitively registers data in a single calibration registration number under various photographing conditions, viewpoint detection precision can be improved by correcting the deviation using the updated accumulated data.

Such a video camera is not always used by a single user, but is often used by a plurality of users in turn.

For example, at a party or tourist spot, a video camera is not always used by a single photographer, but is normally used in turn by many photographers.

However, since the video camera described in Japanese Patent Application No. 4-262750 can store data for differences among individuals for a predetermined number of photographers, when the number of photographers exceeds the predetermined value, one of the already stored data must be erased.

In order to perform, in advance, a calibration necessary for achieving accurate viewpoint detection, a relatively long period of time is required, and a user does not positively use a viewpoint detection mode for this reason.

SUMMARY OF THE INVENTION

The present invention has been made in consideration of the above-mentioned problems, and has as its object to provide a viewpoint detection apparatus which can be utilized by many users without erasing already stored data, and can easily perform accurate viewpoint detection.

In order to achieve the above object, according to a preferred aspect of the present invention, there is disclosed a viewpoint detection apparatus comprising viewpoint detection means for detecting a viewpoint position of an observer with respect to a screen, correction means for correcting a detection output from the viewpoint detection means in correspondence with a deviation between a visual axis direction and a viewpoint direction, and outputting information of the viewpoint direction of an eye of the observer, correction coefficient generation means for calculating a correction coefficient for the correction performed by the correction means, and a memory for storing at least one correction coefficient or data for calculating the correction coefficient so as to generate the correction coefficient, which is characterized by first correction coefficient generation means for calculating the correction coefficient using data stored in the memory and second correction coefficient generation means for calculating the correction coefficient without using data stored in the memory.

According to another preferred aspect of the present invention, there is also disclosed a viewpoint detection apparatus further comprising selection means for selecting one of the first correction coefficient generation means for calculating the correction coefficient using data stored in the memory, and the second correction coefficient generation means for calculating the correction coefficient without using data stored in the memory.

According to still another preferred aspect of the present invention, there is also disclosed a viewpoint detection apparatus further comprising system control means for, when the second correction coefficient generation means for calculating the correction coefficient without using data stored in the memory is selected, erasing data stored in the memory.

According to still another preferred aspect of the present invention, there is also disclosed a viewpoint detection apparatus, wherein the memory stores at least one correction data independent from an eye of a specific observer.

According to still another preferred aspect of the present invention, there is also disclosed a viewpoint detection apparatus, wherein the one correction data independent from the eye of the specific observer is an average value of correction data obtained in advance from a plurality of observers.

According to still another preferred aspect of the present invention, there is also disclosed a viewpoint detection apparatus, wherein the one correction data independent from the eye of the specific observer is correction data obtained from data obtained by statistically processing deviations between viewpoints and visual axes of a plurality of observers.

According to still another preferred aspect of the present invention, there is also disclosed a viewpoint detection apparatus, wherein when an operation for requesting viewpoint detection is performed without executing an operation for calculating the correction coefficient for the correction means, the correction means loads the correction data from the memory.

According to still another preferred aspect of the present invention, there is also disclosed a video camera comprising the above-mentioned viewpoint detection apparatus.

According to still another preferred aspect of the present invention, there is disclosed a viewpoint detection apparatus, wherein one of means for calculating a correction coefficient using data for differences among individuals stored in a memory, and means for calculating a correction coefficient without using data for differences among individuals can be selected, and when a calibration is executed by selecting the means for calculating a correction coefficient without using data for differences among individuals stored in the memory, previous data for differences among individuals is erased and is rewritten with a new value obtained by the calibration.

According to still another preferred aspect of the present invention, there is disclosed a viewpoint detection apparatus, wherein since a predetermined correction coefficient, which cannot be rewritten, is stored in the memory, viewpoint detection data of a photographer for whom a calibration is not executed can be relatively accurately corrected based on the stored coefficient.

It is another object of the present invention to provide a viewpoint detection apparatus which can reduce the load upon execution of a calibration operation, and eliminate troublesome operations when the apparatus is used by a plurality of users.

It is still another object of the present invention to provide a viewpoint detection apparatus which allows a plurality of users to use the apparatus without impairing viewpoint detection accuracy for a specific user.

It is still another object of the present invention to provide a viewpoint detection apparatus, which can discriminate whether the eye to be subjected to viewpoint detection is the right or left eye of an operator, and can automatically perform accurate viewpoint detection in accordance with corresponding correction information.

Other objects and features of the present invention will become apparent from the following description of the embodiments taken in conjunction with the accompanying drawings.

BRIEF DESCRIPTION OF THE DRAWINGS

FIG. 9 is a flow chart showing the calibration operation according to the third embodiment of the present invention;

DETAILED DESCRIPTION OF THE PREFERRED EMBODIMENTS

An embodiment of a viewpoint detection apparatus according to the present invention will be described below with reference to the accompanying drawings.

Figure 1:
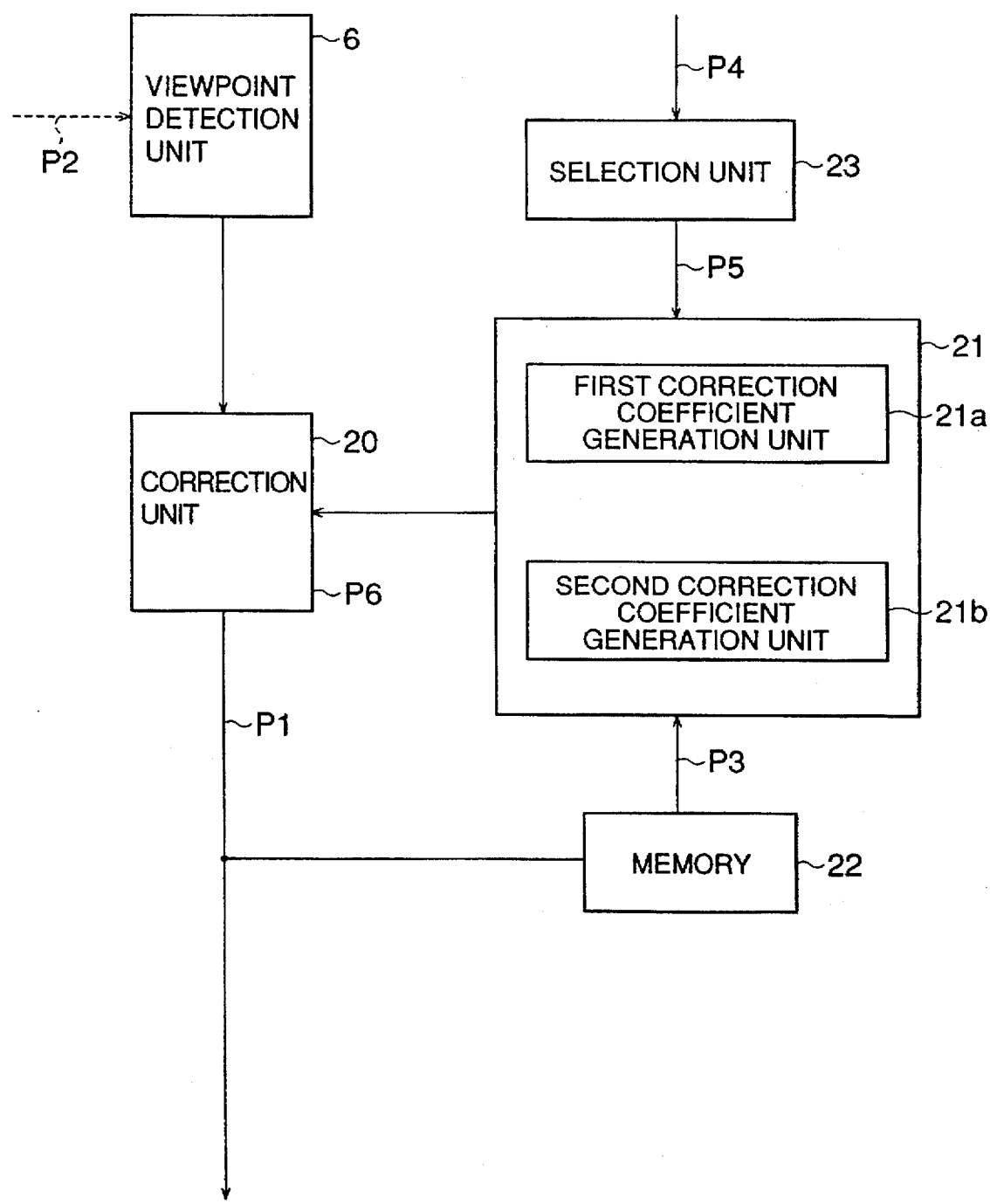
FIG. 1 is a schematic block diagram showing the arrangement of a viewpoint detection apparatus according to the present invention.
Figure 2:
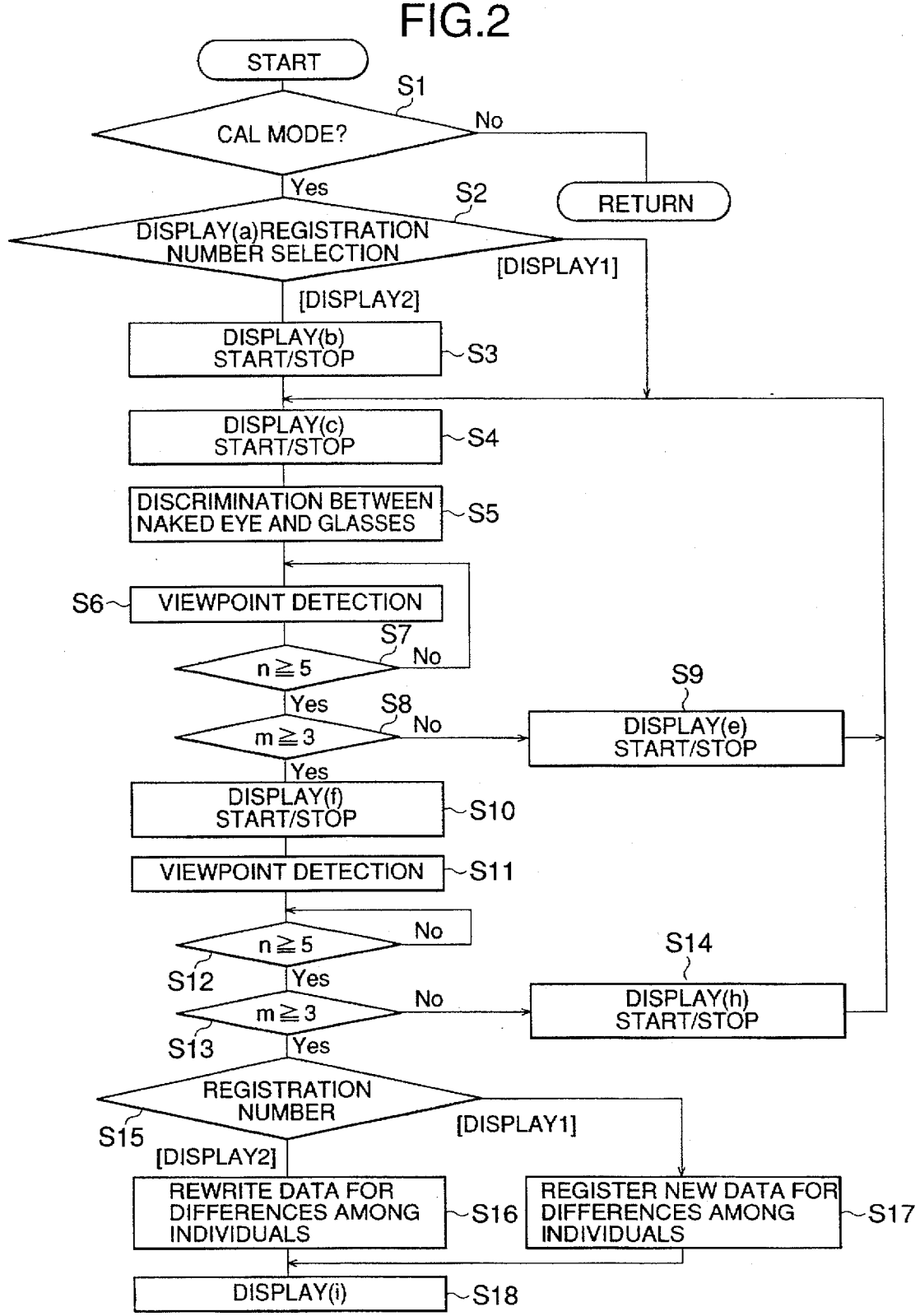
FIG. 2 is a flow chart showing the calibration processing according to an embodiment of the viewpoint detection apparatus of the present invention.
Figure 3:
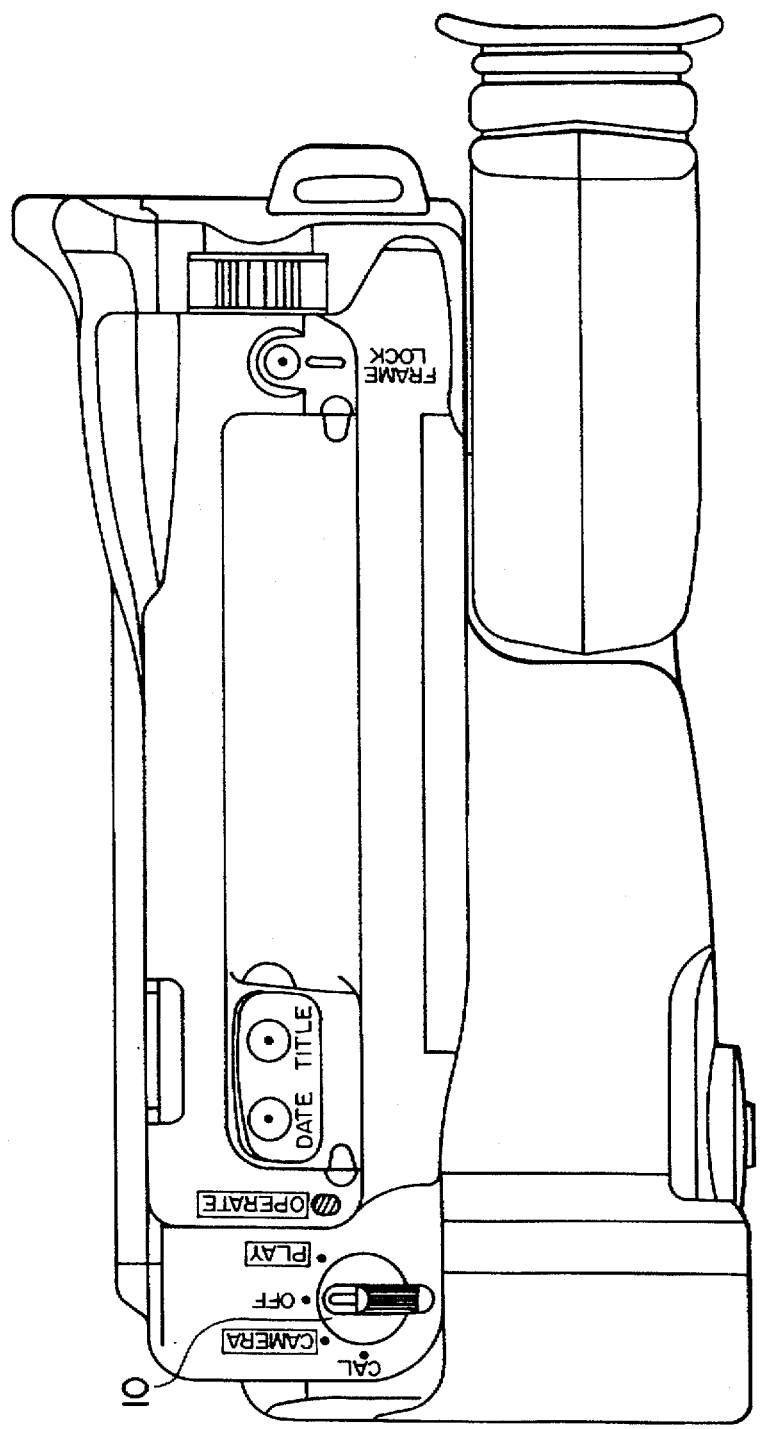
FIG. 3 is a top view of a video camera of the present invention.
Figure 4:
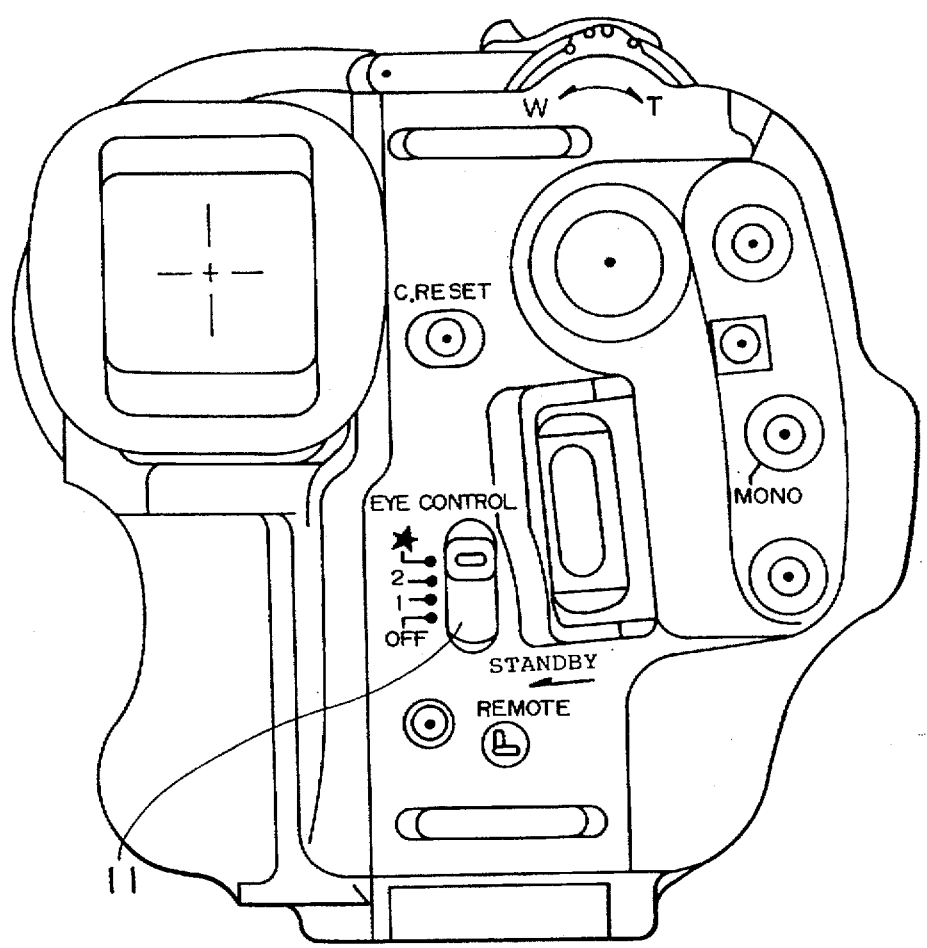
FIG. 4 is a rear view of the video camera of the present invention.
Figure 5:
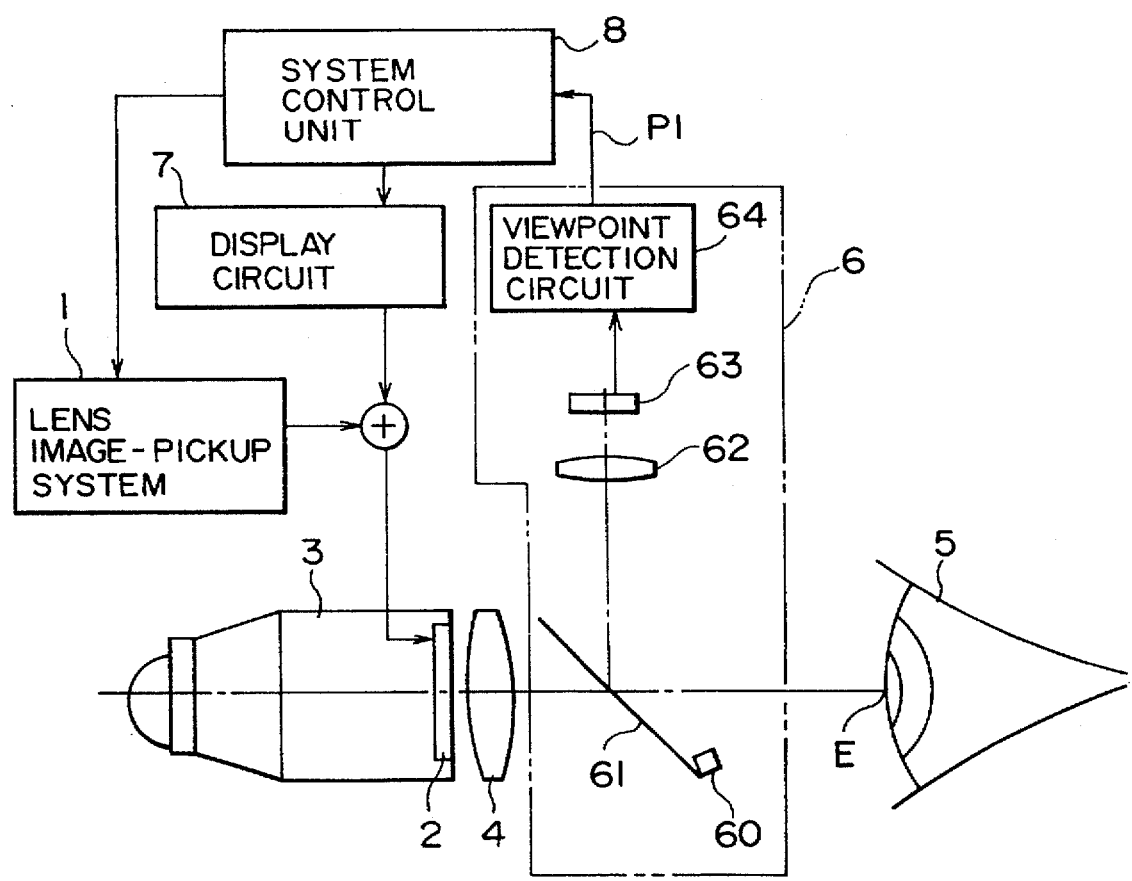
FIG. 5 is a schematic diagram of the video camera of the present invention.
Figure 6:
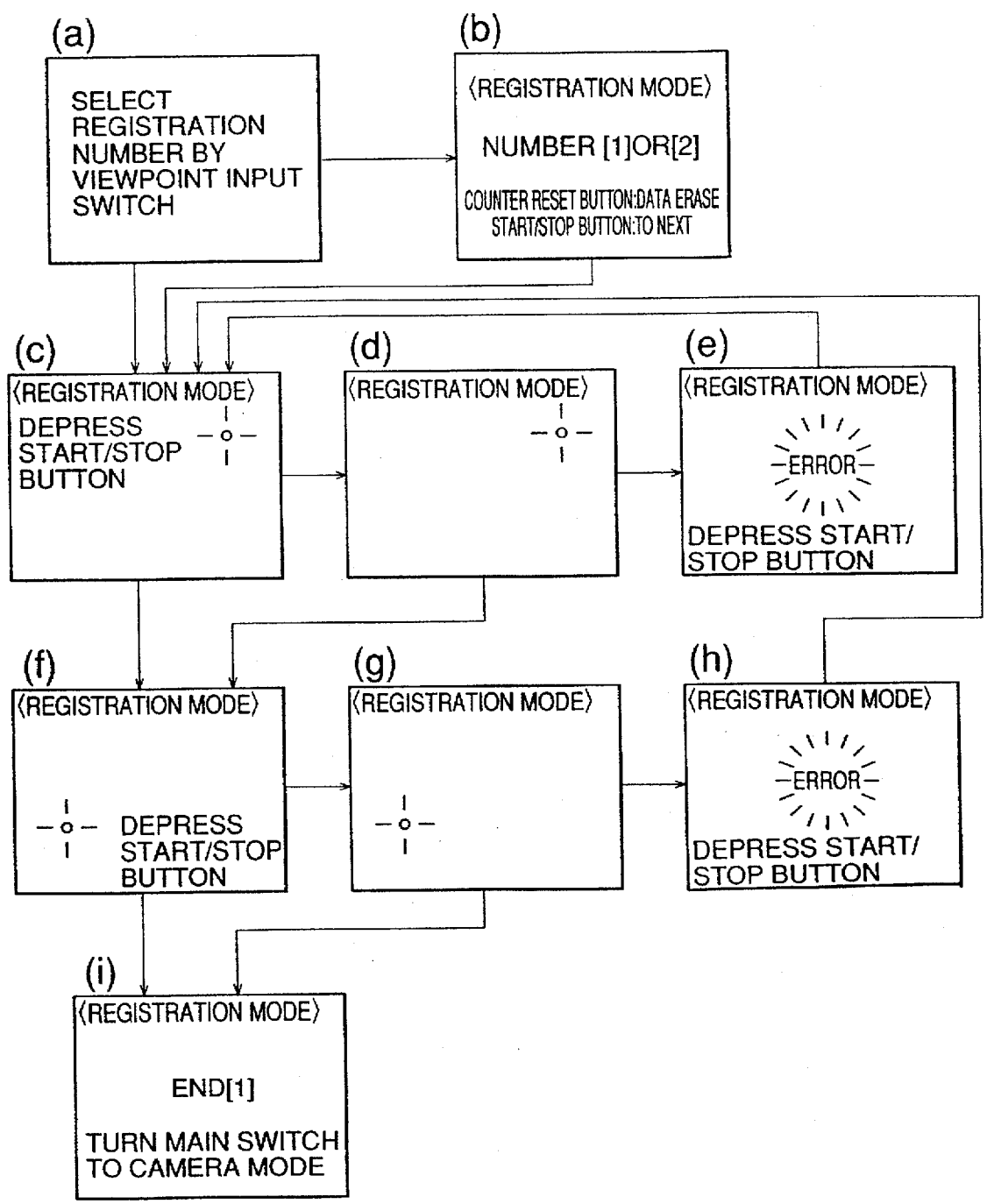
FIG. 6 is a chart showing the display states on a finder screen in a calibration mode.
Figure 7:
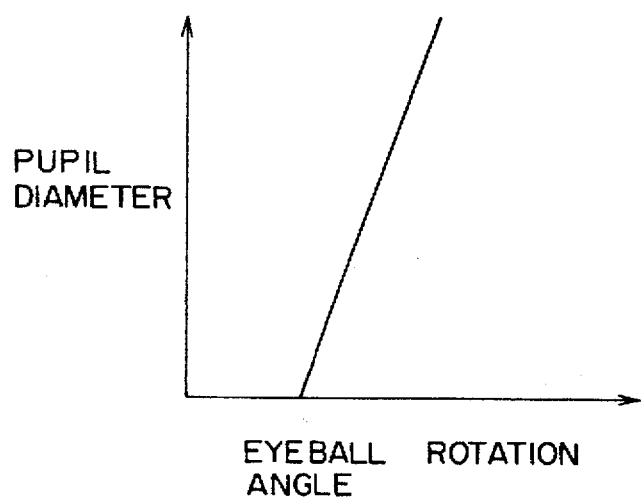
FIG. 7 is a graph showing a change in eyeball rotation angle depending on the pupil diameter upon observation on a single point.

FIG. 1 is a schematic block diagram showing the arrangement of a viewpoint detection apparatus according to the present invention, FIG. 2 is a flow chart showing the calibration operation of the present invention, and FIGS. 3 and 4 are respectively a top view and a rear view of a video camera to which the present invention is applied. FIG. 5 is a schematic diagram showing the arrangement of the video camera of the present invention, FIG. 6 is a chart showing the display states on a finder screen in a calibration mode, and FIG. 7 is a graph showing a change in eyeball rotation angle depending on the pupil diameter upon observation of a single point.

As shown in FIG. 1, a viewpoint detection apparatus of this embodiment comprises a viewpoint detection unit 6, a correction unit 20, a correction coefficient generation unit 21, a memory 22, and a selection unit 23.

The viewpoint detection unit 6 detects the position of a visual axis E of an observer on the finder screen on the basis of visual axis information P2. The correction unit 20 corrects the detection output from the viewpoint detection unit 6 in correspondence with the deviation between the visual axis direction and the viewpoint direction, and outputs information P1 of the viewpoint direction of the eye of the observer.

The correction coefficient generation unit 21 is arranged for calculating a correction coefficient P6 for the correction unit 20. The memory 22 stores a correction coefficient used for generating a correction coefficient in the correction coefficient generation unit 21, and data P3 used for calculating a correction coefficient. In this embodiment, the memory 22 stores at least one correction coefficient or data for calculating a correction coefficient.

The correction coefficient generation unit 21 includes first and second correction coefficient generation units 21a and 21b.

Of these two correction coefficient generation units 21a and 21b, the first correction coefficient generation unit 21a calculates the correction coefficient P6 using the data P3 stored in the memory 22. The second correction coefficient generation unit 21b calculates the correction coefficient P6 without using data stored in the memory 22.

The selection unit 23 selects based on input selection information P4 whether the correction coefficient is calculated using the first or second correction coefficient generation unit 21a or 21b, and outputs a selection signal P5 to the correction coefficient generation unit 21 in accordance with the selection information P4.

A video camera which adopts the viewpoint detection apparatus of the present invention will be described below with reference to the accompanying drawings.

As shown in FIG. 5, the video camera of this embodiment comprises a lens image-pickup system 1, a finder screen 2, a finder 3, an eyepiece lens 4, a viewpoint detection unit 6, a display circuit 7, and a system control unit 8.

The lens image-pickup system 1 picks up an image of an object, and comprises a zoom lens. The finder 3 is used for observing an object image picked up by the lens image-pickup system 1, and comprises the finder screen 2. The finder is constituted by an electronic viewfinder comprising, e.g., a liquid crystal element, a CRT, or the like.

The eyepiece lens 4 is arranged in front of the finder 3. A photographer observes the finder screen 2 via the eyepiece lens 4. The viewpoint detection unit 6 detects a visual axis E of an eye 5 of the photographer.

The display circuit 7 displays, on the finder screen 2, an AF frame indicating an approximate position of a focus area, an index of a viewpoint input switch (to be described later), and information necessary for a photographer such as a tape counter, a photographing mode, and the like. The system control unit 8 comprises a microcomputer, and controls the respective units of the camera.

The viewpoint detection unit 6 comprises an infrared light-emitting diode (IRED) 60 for irradiating infrared light onto the eye 5 of the photographer, a dichroic mirror 61 for transmitting visible light therethrough and reflecting infrared light, a focusing lens 62 for focusing the infrared light reflected by the dichroic mirror 61, a photoelectric conversion element 63 such as a CCD for converting the infrared light focused by the focusing lens 62 into an electrical signal, and a viewpoint detection circuit 64 for calculating the position, on the finder screen, of a viewpoint of the photographer on the basis of the image of the eye 5 of the photographer on the photoelectric conversion element 63.

Since the dichroic mirror 61 transmits visible light therethrough, the photographer can observe the finder screen 2 via the eyepiece lens 4.

Since the dichroic mirror 61 reflects infrared light, it can reflect a reflected image of the eye 5 irradiated with the light emitted from the IRED 60. The reflected image is focused by the focusing lens 62, and is formed on the photoelectric conversion element 63.

The viewpoint detection circuit 64 comprises a memory (not shown), and detects the viewpoint, on the finder screen 2, of the photographer on the basis of the image of the eye 5 of the photographer on the photoelectric conversion element 63 in accordance with an algorithm disclosed in, e.g., Japanese Laid-Open Patent Application Nos. 1-241511, 2-32312, and the like.

According to the video camera of this embodiment with the above-mentioned arrangement, various functions can be used by utilizing the visual axis. For example, the photographing mode of the camera can be selected by the visual axis, the focal point can be adjusted to the viewpoint on the basis of the visual axis, and so on.

As described in the above two references (Japanese Laid-Open Patent Application Nos. 1-241511 and 2-32312), since the visual axis direction is normally slightly different from the viewpoint direction, data for differences among individuals is obtained by performing a calibration before the camera is used, and the deviation between the viewpoint and the visual axis must be corrected using the obtained data. More specifically, the deviation means the difference between the position where a photographer gazes and the viewpoint detected by the viewpoint detection apparatus.

It is known that the deviation between the viewpoint direction and the visual axis direction changes depending on the pupil diameter. FIG. 7 is a graph showing a change in eyeball rotation angle depending on the pupil diameter upon observation on a single point.

On the other hand, since the eyes of a person make a very small, involuntarily generated irregular motion called involuntary eye movement, the visual axis is always slightly moving. For this reason, even when a photographer watches an identical calibration index, the detected visual axis slightly varies.

In consideration of the above-mentioned facts, it is effective for accurate viewpoint detection to repetitively register data for differences among individuals in consideration of previously registered data for differences among individuals in such a manner that a single photographer performs a calibration operation a plurality of number of times under various photographing conditions (especially, under conditions with different brightness levels).

The operation for obtaining data for differences the among individuals will be described in detail below.

The calibration operation will be described in detail below with reference to the accompanying drawings. Referring to FIGS. 3 and 4, a mode switch 10 can be used to select one of three modes, i.e., "CAL (calibration mode)", "CAM (photographing mode)", and "VTR (reproduction mode)".

A slide switch 11 is used for setting a registration number, and can be set at one of four positions [★], [2], [1], and [OFF]. [2] and [1] indicate registered user numbers, and data for two users can be registered in this embodiment. [★] indicates a free mode (to be described later), and [OFF] indicates that the viewpoint detection mode is disabled.

The calibration operation will be described in detail below with reference to FIG. 2. When the calibration mode is selected by operating the mode switch 10, a message for requesting a selection of a registration number is displayed on the finder screen (step S1, a display state (a) in FIG. 6).

When the registration number [1] or [2] is set by operating the slide switch 11 (step S2), the registration number is displayed (a display state (b) in FIG. 6). When a start/stop button is depressed (a display state (c) in FIG. 6), a calibration index [1] (X1, Y1) is displayed (step S3).

The photographer depresses the start/stop button upon observation of the index (a display state (c) in FIG. 6) (step S4). Whether or not the photographer wears glasses is detected (step S5), and viewpoint detection n is continuously executed five times (steps S6 and S7).

In this case, if a viewpoint microcomputer, which is arranged to perform viewpoint detection, can acquire three or more effective data m (step S8), it calculates an average ($\theta x1$, $\theta y1$) of the rotation angle of the eyeball and an average r1 of the pupil diameter of the photographer upon observation of the index [1].

As shown in a display state (f) in FIG. 6, a calibration index [2] (X2, Y2) is displayed at a position different from that in the display state (c) in FIG. 6. Then, the photographer depresses the start/stop button while observing the displayed index (step S10). Viewpoint detection n is continuously executed five times (steps S11 and S12).

If three or more effective viewpoint detection data are acquired (step S13), an average ($\theta x2$, $\theta y2$) of the rotation angle of the eyeball and an average r2 of the pupil diameter of the photographer upon observation of the index [2] (X2, Y2) can be obtained. Data for differences among individuals is rewritten using a formula to be described later (step S16), and a message shown in a display state (i) in FIG. 6 is displayed (step S18).

If three or more effective viewpoint detection data m cannot be acquired in step S8, an error message is displayed on the finder screen, as shown in a display state (e) in FIG. 6. If the start/stop button is depressed at this time (step S9), the message in the display state (c) in FIG. 6 is displayed again. Thus, the photographer can observe the index again (steps S4 to S7).

If three or more effective viewpoint detection data m cannot be acquired in step S13, an error message shown in a display state (h) in FIG. 6 is displayed. If the start/stop button is depressed in this state (step S14), the message in the display state (c) in FIG. 6 is displayed again, and the flow returns to step S4. As a result, the photographer can observe the first calibration index again.

Note that the effective viewpoint detection data m is data, with which the reliability of a Purkinje image and the position of the pupil center is calculated based on the data that falls within a predetermined range, and which is discriminated based on the contrast of an eyeball image, the pupil diameter, and the like.

With the above-mentioned operations, the average ($\theta x1$, $\theta y1$) of the eyeball rotation angle and the average r1 of the pupil diameter of the photographer upon observation of the index [1], and the average (θx2, θy2) of the eyeball rotation angle and the average r2 of the pupil diameter of the photographer upon observation of the index [2] are obtained.

If data for differences among individuals obtained by previous calibrations is stored in the memory 22, a value obtained by adding new data to the stored data multiplied with a predetermined weighting coefficient is registered in the memory as new data for differences among individuals. If no previous data is stored, new data is registered in the memory as data for differences among individuals.

As described above, in this embodiment, since the number of times of calibrations (the number of registered data) and the pupil diameter are taken into account in a process for calculating data for differences among individuals, viewpoint detection accuracy can be improved when a single photographer performs calibrations as many times as possible under various photographing conditions.

The free mode as the characteristic feature of the present invention will be described in detail below with reference to the accompanying drawings.

First, the slide switch 11 for setting a registration number shown in FIG. 4 is adjusted to the "free" position. Then, no message for requesting selection of a registration number is displayed on the finder screen 2, and the calibration index [1] (X1, Y1) is displayed, as shown in the display state (c) in FIG. 6. The photographer depresses the start/stop button while observing the index (step S4).

Whether or not the photographer wears glasses is detected (step S5), and viewpoint detection n is continuously executed five times (steps S6 and S7). If the viewpoint microcomputer can acquire three or more effective data m (step S8), it calculates an average (θx1, θy1) of the rotation angle of the eyeball and an average r1 of the pupil diameter of the photographer upon observation of the index [1].

As shown in the display state (f) in FIG. 6, a calibration index [2] (X2, Y2) is displayed at a position different from that in the display state (c) in FIG. 6. Then, the photographer depresses the start/stop button again while observing the displayed index (step S10).

Viewpoint detection n is continuously executed five times (steps S11 and S12). If three or more effective viewpoint detection data are acquired (step S13), an average (θx2, θy2) of the rotation angle of the eyeball and an average r2 of the pupil diameter of the photographer upon observation of the index [2] (X2, Y2) can be obtained. Then, data for differences among individuals corresponding to the registration number is rewritten by a formula to be described later (step S16), and a message in a display state (i) in FIG. 6 is displayed (step S18).

On the other hand, if three or more effective viewpoint detection data m cannot be acquired in step S8, an error message is displayed on the finder screen, as shown in the display state (e) in FIG. 6. If the start/stop button is depressed at this time (step S9), the message in the display state (c) in FIG. 6 is displayed again. Thus, the photographer can observe the index again (steps S4 to S7).

If three or more effective viewpoint detection data m cannot be acquired in step S13, an error message shown in the display state (h) in FIG. 6 is displayed. If the start/stop button is depressed in this state (step S14), the message in the display state (c) in FIG. 6 is displayed, and the flow returns to step S4. As a result, the photographer can observe the first calibration index again.

With the above-mentioned operations, the average (θx1, θy1) of the eyeball rotation angle and the average r1 of the pupil diameter of the photographer upon observation of the index [1], and the average (θx2, θy2) of the eyeball rotation angle and the average r2 of the pupil diameter of the photographer upon observation of the index [2] are obtained. In the free mode, if data for differences among individuals obtained by previous calibrations has already been stored in the memory, the stored data is erased, and new data is registered as data for differences among individuals.

The second embodiment of a viewpoint detection apparatus according to the present invention will be described below. The schematic arrangement of a video camera and means for calculating a correction coefficient for differences among individuals in the second embodiment are the same as those in the first embodiment described above, and a detailed description thereof will be omitted.

A correction coefficient of the second embodiment will be described below. In the video camera of the second embodiment, when the slide switch 11 shown in FIG. 4 is set at the "free mode" position, correction data pre-stored in the memory 22 is loaded into the correction unit. The correction data is an average value of correction data for a plurality of photographers, which are acquired in advance.

The correction data may be one obtained based on data, which is obtained by statistically processing deviations between the viewpoints and the visual axes of a plurality of users.

When the correction data is used, even when a photographer who does not execute any calibration looks into the finder, a deviation between the viewpoint direction and the visual axis direction of the photographer can be substantially corrected.

According to the above-mentioned embodiments, since a correction coefficient can be calculated without using data stored in the memory, even when the camera is used by many users, viewpoint detection can be performed without erasing already stored data. Therefore, even when the camera is temporarily used by another user, it is convenient since the memory contents need not be erased every time different users use the camera. In addition, accurate viewpoint detection can be easily performed.

According to the above-mentioned embodiments, when a calibration is executed, and data obtained by the calibration is not data of the eye of an observer stored in the memory, a deviation between the viewpoint and the visual axis can be corrected to some extent.

According to the above-mentioned embodiments, when a viewpoint detection request is made without executing any calibration, correction data is loaded from the memory. Therefore, an observer need not perform an operation for loading correction data.

According to the above-mentioned embodiments, even a photographer who does not execute any calibration can execute various functions of the video camera using the visual axis.

The third embodiment of the present invention will be described below.

In a conventional viewpoint detection apparatus, when a user, who wears glasses or looks into the finder with a relatively large distance between his or her eye and the finder, looks into the finder especially outdoor, the eyeball and its surrounding portion of the observer are directly irradiated with sunlight, and intense light is incident on a photoelectric conversion element for picking up an eyeball image. For this reason, the pupil edge and cornea reflected image of the observer cannot be normally detected, and proper viewpoint detection is disturbed.

The direction and amount of the deviation between the visual axis and viewpoint of the eyeball are different not only among individuals but also between the right and left eyes of a single observer. For this reason, for a user who does not always look into the finder with a specific eye, calibration data for the right and left eyes must be separately registered. Each time such a user looks into the finder with a different eye, the data must be switched, resulting in a troublesome operation.

The embodiment to be described below has been made in consideration of the above situation, and has as its object to provide an observation apparatus which always guarantees proper viewpoint detection, and can realize good operability.

In order to achieve the above object, according to the embodiment to be described below, the viewpoint position of an observer with respect to the finder screen is detected, and correction corresponding to the deviation between the visual axis direction and the viewpoint direction is made for the viewpoint detection output, so as to output information of the viewpoint direction of the observer, and to store at least one correction coefficient for performing correction or data for calculating the correction coefficient. In particular, the apparatus has an eyecup which is formed to match the contour of an observer at the end portion of the finder, so as to shield intense light from outside the finder.

The eyecup may be formed specially for the right or left eye, or may be formed to be exchangeable between the two eyes. On the other hand, there is disclosed an observation apparatus comprising an eyecup which can be used for both eyes when it is rotated at a finder attachment portion is disclosed.

According to the embodiment to be described below, there is disclosed an observation apparatus comprising means for detecting the rotation position of the eyecup. Alternatively, there is disclosed an observation apparatus comprising an eyecup having a portion which can be folded, so that the eyecup can be exclusively used for the right or left eye.

Furthermore, the observation apparatus further comprises means for discriminating the shape or state of the attached eyecup. Alternatively, there is disclosed an observation apparatus which can select a correction coefficient of the correction unit in correspondence with the state of the eyecup attached to the finder.

According to this embodiment, a viewpoint detection apparatus comprises detection means for detecting a viewpoint position of an observer with respect to a screen, correction means for detecting and correcting a deviation between a visual axis direction and a viewpoint direction with respect to the viewpoint detection output from the detection means, storage means which can store a plurality of pieces of correction information to be used by the correction means, discrimination means for discriminating if an eye that gazes at the screen is the right or left eye, and control means for reading out corresponding correction information from the storage means in accordance with the discrimination result of the discrimination means, and correcting the detection means.

In this case, there is disclosed a viewpoint detection apparatus, wherein the discrimination means includes an eyecup which is arranged on a peripheral portion of the screen, and is movable between right and left eye observation positions, and the control means selects correction information to be read out from the storage means in accordance with information indicating whether the eyecup is located at the right or left eye observation position.

This embodiment is preferably applied to a video camera. According to the eyecup of the present invention, which is attached to the finder, since the eyecup can shield intense light from outside the finder, proper viewpoint detection can be guaranteed even under direct sunlight. In an observation apparatus of this type, the eyecup is used not only as a simple eyecup, but also helps to provide an original function of the viewpoint detection apparatus.

According to this embodiment, calibration data and the like can be stored in the memory, and the eyecup itself can discriminate whether the right or left eye looks into the finder. Alternatively, the apparatus comprises means for discriminating the shape or state of the eyecup attached to the finder, and registered calibration data is read out in accordance with the discrimination result. Furthermore, there is disclosed a viewpoint detection apparatus, wherein system control means can load data for differences among individuals in accordance with the discrimination result of the right or left eye without requiring any special operations.

Moveover, according to a viewpoint detection apparatus of this embodiment, the right or left eye is automatically discriminated, and correction information corresponding to the discriminated eye is read out to perform correction. With this control, an observer need not select correction information each time he or she looks into the finder with a different eye, thus improving operability.

This embodiment will be described in detail below with reference to the accompanying drawings. Note that this embodiment exemplifies a video camera which comprises an observation apparatus as a portion of a finder.

Figure 8:
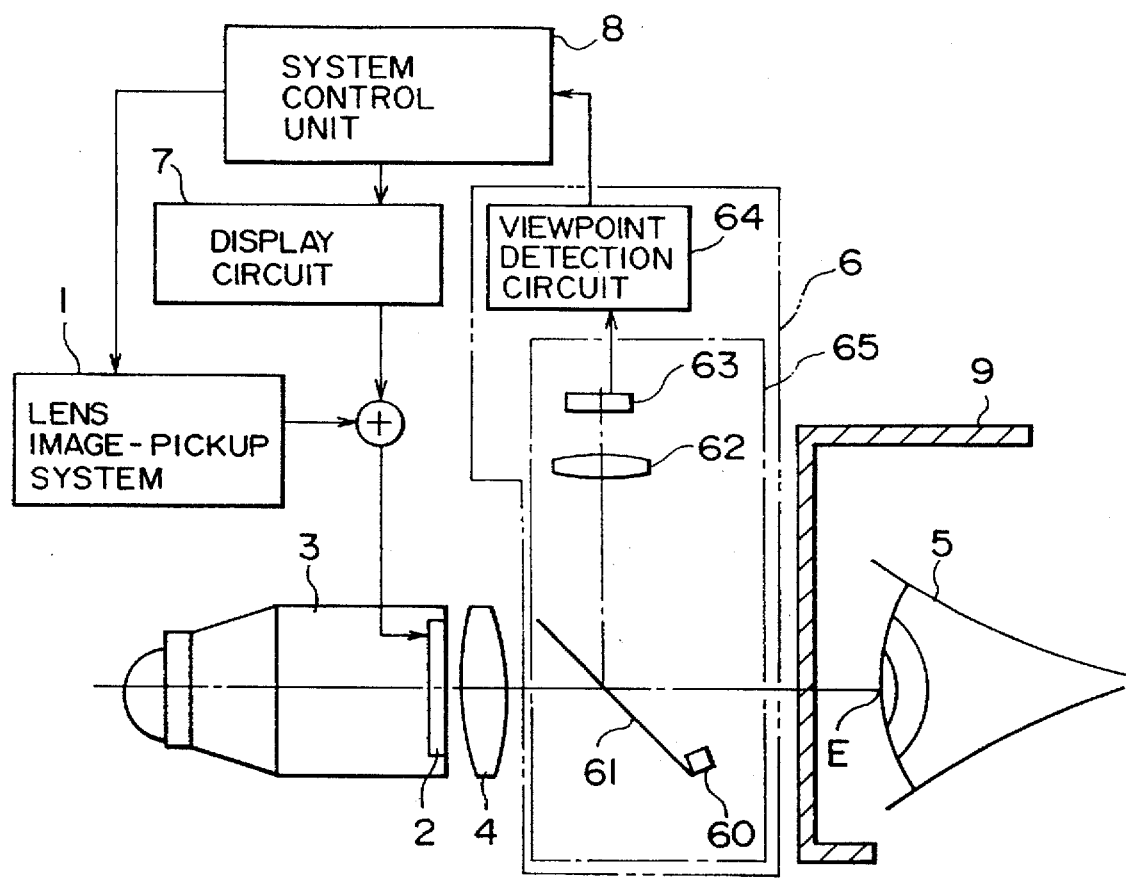
FIG. 8 is a block diagram showing the arrangement according to the third embodiment of the present invention.

FIG. 8 shows the arrangement of a video camera according to the third embodiment of the present invention. In this embodiment, the same reference numerals in FIG. 8 denote the same parts as in the arrangement shown in FIG. 5 of the first embodiment, and a detailed description thereof will be omitted.

Referring to FIG. 8, the difference from the arrangement shown in FIG. 5 is that the apparatus comprises an eyecup 9 for preventing an eye 5 of a photographer from being directly irradiated with intense external light. The detailed arrangement of the eyecup 9 will be described later.

As described above, since the visual axis direction is normally slightly different from the viewpoint direction, in order to accurately obtain a viewpoint, data for differences among individuals must be obtained by performing a calibration before the camera is used, and the deviation between the viewpoint and the visual axis must be corrected using the obtained data. In addition, the direction and amount of the deviation are normally different between the right and left eyes of even a single observer. For this reason, for a user who does not always look into the finder with a predetermined eye, calibrations must be performed for both the right and left eyes, and corresponding data for differences among individuals must be registered.

The operation for obtaining the data for differences among individuals will be described below.

An example upon execution of a calibration will be described below with reference to FIGS. 3 to 5 and the flow chart in FIG. 9. FIG. 9 is a flow chart showing the calibration operation, and the display states on the finder screen 2 are as described above with reference to the display states (a) to (i) in FIG. 6.

When a photographer operates the mode switch 10 to set the calibration mode, the system control unit 8 (see FIG. 8) sends a signal to the display circuit 7, and displays a message for requesting selection of a registration number on the finder screen 2 (FIG. 9; S101, FIG. 6; the display state (a)). When the photographer selects the registration number [1]

or [2] using the slide switch 11 in FIG. 5 (FIG. 9; S102), the registration number is displayed on the finder screen 2 (FIG. 9; S103, FIG. 6; the display state (b)). When the photographer depresses the start/stop button, calibration index 1 (X1, Y1) is displayed, as shown in the display state (c) in FIG. 6 (FIG. 9; S104). When the photographer sets the slide switch 11 for setting the registration number at the position "★", the free mode is set, and calibration index 1 (X1, Y1) shown in the display state (c) in FIG. 6 is displayed on the finder screen 2 without displaying any registration number (FIG. 9; S104).

When the photographer depresses the start/stop button while observing the index with an eye with which he or she normally looks into the finder 3, the viewpoint detection circuit 64 (FIG. 8) detects whether or not the photographer wears glasses (FIG. 9; S105). Thereafter, viewpoint detection is continuously executed five times (FIG. 9; S106 and S107). In this case, if the viewpoint detection circuit 64 can acquire three or more effective data (FIG. 9; S108), it calculates an average ($\theta x1$, $\theta y1$) of the eyeball rotation angle and an average r1 of the pupil diameter of the photographer upon observation of index 1 (FIG. 9; S110).

Then, the display circuit 7 displays calibration index 2 (X2, Y2) at a position different from that in the display state (c) in FIG. 6, as shown in the display state (f) in FIG. 6 (FIG. 9; S111). When the photographer depresses the start/stop button again while observing the index, the viewpoint detection circuit 64 continuously executes viewpoint detection five times (FIG. 9; S112 and S113). If three or more effective viewpoint detection data can be acquired (FIG. 9; S114), an average ($\theta x2$, $\theta y2$) of the eyeball rotation angle and an average r2 of the pupil diameter of the photographer upon observation of index 2 are calculated (FIG. 9; S116).

The viewpoint detection circuit 64 calculates data for differences among individuals corresponding to the registration number on the basis of the results obtained by the above-mentioned operations, i.e., the average ($\theta x1$, $\theta y1$) of the eyeball rotation angle and the average r1 of the pupil diameter of the photographer upon observation of index 1, and the average ($\theta x2$, $\theta y2$) of the eyeball rotation angle and the average r2 of the pupil diameter of the photographer upon observation of index 2 (FIG. 9; S117).

When the photographer selects [1] or [2] using the slide switch 11 for setting the registration number (FIG. 9; S118), and data for differences among individuals obtained by the previous calibration has already been stored in the memory, the viewpoint detection circuit 64 registers a value obtained by adding new data to the stored data multiplied with a predetermined weighting coefficient in the memory as new data for differences among individuals (FIG. 9; S119). The display circuit 7 makes a display, as shown in the display state (i) in FIG. 6 (FIG. 9; S121). On the other hand, if no data is stored in the memory, new data is registered as data for differences among individuals.

When the photographer selects [★] using the slide switch 11 (FIG. 9; S118), and data for differences among individuals obtained by the previous calibration has already been stored in the memory, the viewpoint detection circuit 64 erases the stored data and registers new data as data for differences among individuals (FIG. 9; S120), and the display circuit 7 makes a display, as shown in the display state (i) in FIG. 6 (FIG. 9; S121).

If the viewpoint detection circuit 64 cannot acquire three or more effective viewpoint detection data in step S108 in FIG. 9, a message "error" is displayed on the finder screen, as shown in the display state (e) in FIG. 6 (FIG. 9; S109).

When the photographer depresses the start/stop button, the display state (c) in FIG. 6 is resumed, and the photographer repeats steps S105 to S107 again while observing the index. If three or more effective view point detection data cannot be acquired in step S114, a message shown in the display state (h) in FIG. 6 is displayed (FIG. 9; S115). When the photographer depresses the start/stop button, a message is displayed, as shown in the display state (c) in FIG. 6, and the flow returns to step S104. As a result, the photographer observes the first calibration index again.

Note that the effective viewpoint detection data is data, with which the reliability of a Purkinje image and the position of the pupil center is calculated based on the data that falls within a predetermined range, and which is discriminated based on the contrast of an eyeball image, the pupil diameter, and the like.

Since the number of times of calibrations (the number of registered data) and the pupil diameter are taken into account in a process for calculating data for differences among individuals, viewpoint detection accuracy can be improved when a single photographer performs calibrations as many times as possible under various photographing conditions.

On the other hand, when a user does not always look into the finder 3 with a specific eye, he or she should perform calibrations for both the right and left eyes. In this case, for example, data for differences among individuals obtained upon execution of a calibration with the right eye is registered in correspondence with registration number [1]. Similarly, data for differences among individuals obtained upon execution of a calibration with the left eye is registered in correspondence with registration number [2].

The characteristic feature of the present invention will be described below.

Figure 10A:
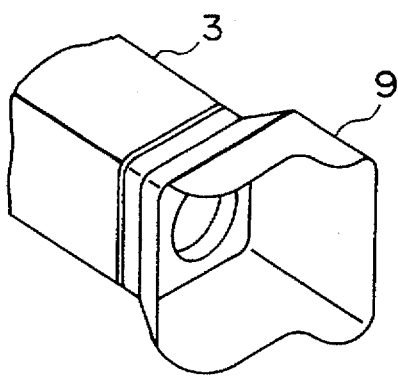
FIGS. 10A and 10B are respectively a perspective view and a side view of an eyecup set for the right eye according to the third embodiment of the present invention.
Figure 10B:
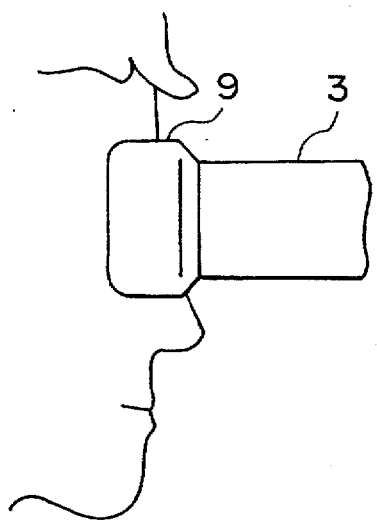
Figure 11A:
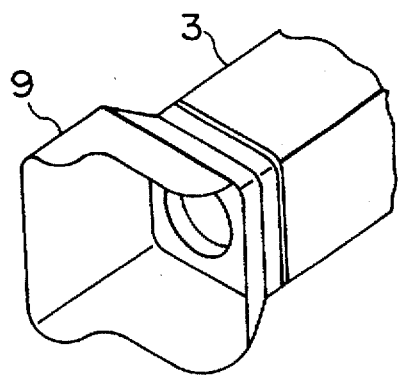
FIGS. 11A and 11B are respectively a perspective view and a side view of the eyecup set for the left eye according to the third embodiment of the present invention.
Figure 11B:
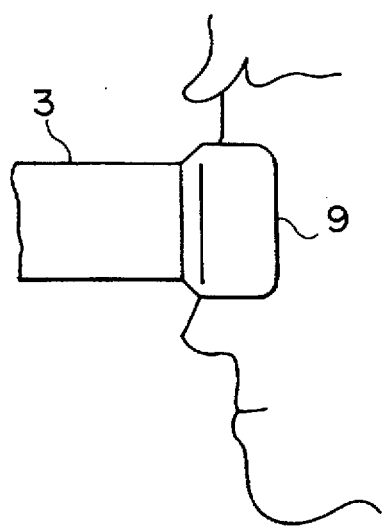

The eyecup 9 for shielding intense external light is attached to the finder 3, as shown in FIGS. 10A and 10B or FIGS. 11A and 11B. The eyecup 9 is formed to match the contour of the observer (especially, a portion around the eye of the observer). The eyecup 9 is rotatable through 180° about the optical axis of the finder 3, and can be set at a position shown in FIGS. 10A and 10B, and a position shown in FIGS. 11A and 11B. For example, when the eyecup 9 is set, as shown in FIG. 10A, a user can properly look into the finder 3 with only the right eye, as shown in FIG. 10B. On the other hand, when the eyecup 9 is set, as shown in FIG. 11A, a user can properly look into the finder 3 with only the left eye, as shown in FIG. 11B.

Assume that the photographer registers data for differences among individuals for the right eye in [1] and for the left eye in [2] by operating the slide switch 11 (FIG. 4).

Figure 12:
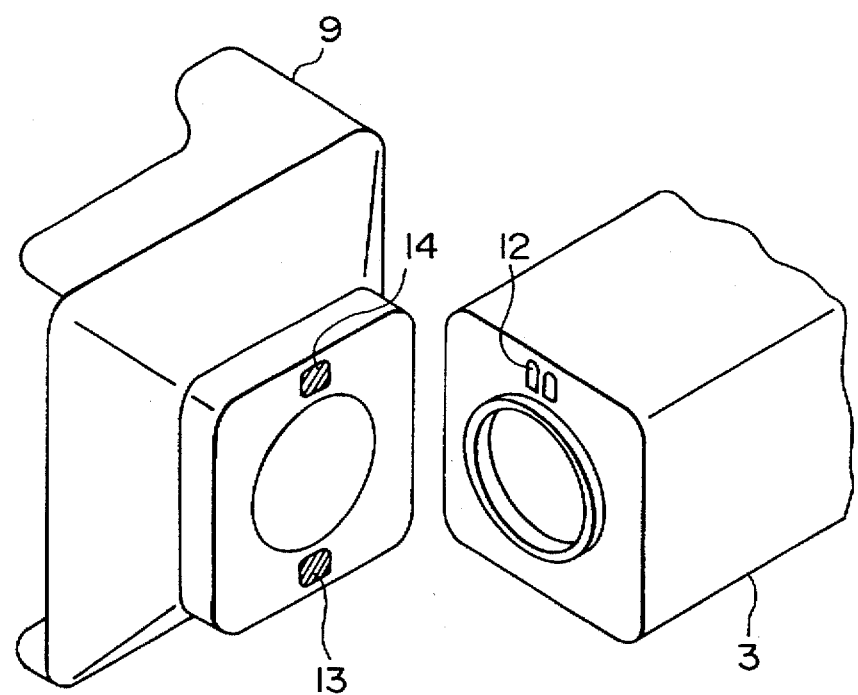
FIG. 12 is a perspective view of an attachment portion of the eyecup according to the third embodiment of the present invention.

An electrical contact 12 is arranged on an eyecup attachment portion of the finder 3, as shown in FIG. 12. On the other hand, the eyecup 9 has two contacts 13 and 14, which selectively contact the contact 12 on the finder 3 side when the eyecup 9 is set for the right and left eyes, respectively. These contacts 13 and 14 consist of different materials to have different resistances. Therefore, the system control unit 8 can easily detect based on the difference in resistance upon attachment of the eyecup 9 if the eyecup 9 is set for the right or left eye.

For example, when the eyecup 9 is set in the direction of FIGS. 10A and 10B, the system control unit 8 loads data for differences among individuals for the right eye registered in correspondence with registration number [1]. On the other hand, when the eyecup 9 is set in the direction of FIGS. 11A and 11B, the system control unit 8 loads data for differences among individuals for the left eye registered in correspondence with registration number [2].

In this embodiment, the single eyecup 9 can be used for both the right and left eyes since it is rotatable. Alternatively, eyecups for the right and left eyes, which are easily detachable from the finder 3, may be separately prepared, and may be exchanged as needed.

Figure 13A:
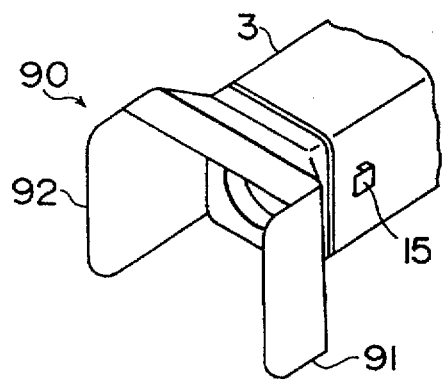
FIGS. 13A to 13C are perspective views showing an eyecup according to the fourth embodiment of the present invention.
Figure 13B:
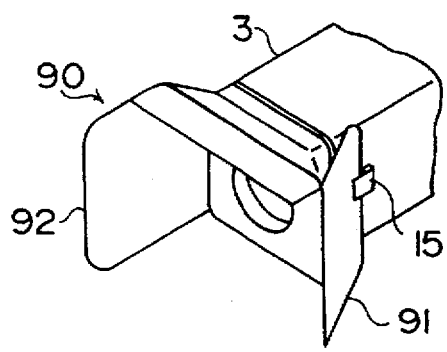
Figure 13C:
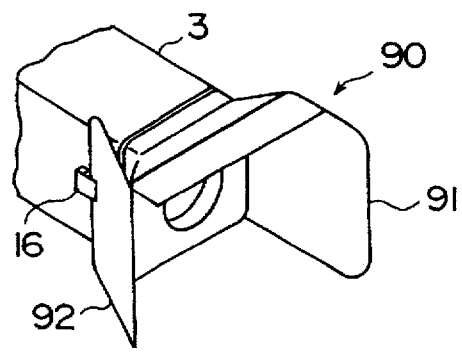

FIGS. 13A, 13B, and 13C show the arrangement of an eyecup 90 according to another embodiment of the present invention. In the following description, a video camera which comprises an observation apparatus according to this embodiment as a portion of the finder 3 will be exemplified. However, since the schematic arrangement of the video camera is substantially the same as those of the above embodiments, a detailed description thereof will be omitted.

FIGS. 13A to 13C show the attachment portions of the eyecup 90 and the finder 3. As shown in FIGS. 13A to 13C, the eyecup 90 has two side portions 91 and 92, which can be folded. Pawls 15 and 16 are added on the two side surfaces of the outer case of the finder 3, so that the pawls 15 and 16 can respectively fix the two side portions 91 and 92 when the two side portions 91 and 92 are folded, as shown in FIG. 13B or 13C.

For example, when the side portion 91 is folded, as shown in FIG. 13B, a user can look into the finder with the left eye. On the other hand, when the side portion 92 is folded, as shown in FIG. 13C, a user can look into the finder with the right eye. In this case, the pawls 15 and 16 have touch sensors, and the system control unit 8 can discriminate which one of the side portions 91 and 92 is folded.

Assume that the photographer registers data for differences among individuals for the right eye in [1] and that for the left eye in [2] by operating the slide switch 11.

For example, when the eyecup 90 is set in the state shown in FIG. 13C, the system control unit 8 loads data for differences among individuals for the right eye registered in correspondence with registration number [1]. On the other hand, when the eyecup 90 is set in the state shown in FIG. 13B, the system control unit 8 loads data for differences among individuals for the left eye registered in correspondence with registration number [2].

As described above, according to the above-mentioned embodiment, intense external light can be shielded by the eyecup, and can be prevented from being directly irradiated onto the eyeball and its peripheral portion. Therefore, proper viewpoint detection can be guaranteed even under direct sunlight in the outside.

According to the above-mentioned embodiment, a user can be prevented from looking into the finder with an eye for which data is not stored.

According to the above-mentioned embodiment, even when a user looks into the finder with an eye for which data is not stored, the eyecup can be easily switched, thus allowing easy handling.

According to the above-mentioned embodiment, easy operations are assured independently of the state of the attached eyecup.

According to the above-mentioned embodiment, since the eyecup need only be switched, and data for differences among individuals need not be re-set, the operations can be simplified, and an operation error can be avoided.

Furthermore, according to the above-mentioned embodiment, since the right or left eye is automatically discriminated, and correction can be made using correction information which is read out in correspondence with the discriminated eye, an observer need not select correction information each time he or she looks into the finder with a different eye, thus improving operability, and reliably preventing a detection error when a user forgets to switch correction information.

What is claimed is:

1. A viewpoint detection apparatus comprising:

viewpoint detection means for detecting a viewpoint position of an observer with respect to a finder screen;

detecting means for detecting a deviation between a visual axis direction and a viewpoint direction on the basis of an output from said viewpoint detection means and outputting information corrective of the viewpoint direction of an eye of the observer;

first correction means for calculating a correction coefficient corresponding to the deviation;

a memory for storing at least the correction coefficient data;

second correction means for calculating the correction coefficient using data stored in said memory; and selection means for selecting one of said first correction means for calculating the correction coefficient without using the data stored in said memory and said second correction means for calculating the correction coefficient using the data stored in the memory.

2. An apparatus according to claim 1, further comprising system control means for, when said first correction means for calculating the correction coefficient without using data stored in said memory is selected, erasing data stored in said memory.

3. An apparatus according to claim 1, wherein said memory stores at least one correction data independent from an eye of a specific observer.

4. An apparatus according to claim 3, wherein the one correction data independent from the eye of the specific observer is an average value of correction data obtained in advance from a plurality of observers.

5. An apparatus according to claim 3, wherein the one correction data independent from the eye of the specific observer is correction data obtained from data obtained by statistically processing deviations between viewpoints and visual axes of a plurality of observers.

6. An apparatus according to claim 1, wherein when an operation for requesting viewpoint detection is performed without executing an operation for calculating the correction coefficient for said second correction means, said second correction means loads the correction data from said memory.

7. An apparatus of claim 1, wherein said apparatus is adapted to be arranged in an optical device of a video camera.

8. A viewpoint detection apparatus comprising:

viewpoint detection means for detecting a viewpoint position and a corresponding viewpoint direction of an observer with respect to a finder screen, and for outputting a corresponding viewpoint direction detection signal;

a memory for storing at least a first set of data for calculating a correction coefficient;

correction coefficient generation means for selectively calculating a correction coefficient using one of first correction coefficient generation means and second correction coefficient generation means for outputting a corresponding correction coefficient signal, said first correction coefficient generation means calculating the correction coefficient using the first set of data stored in said memory, and said second correction coefficient generation means calculating the correction coefficient using a second set of data; and correction means for receiving the viewpoint direction detection signal and the correction coefficient signal, said correction means correcting a deviation between the viewpoint direction and a visual axis and for outputting information corresponding to a corrected viewpoint direction of the observer.

* * * * *

UNITED STATES PATENT AND TRADEMARK OFFICE
CERTIFICATE OF CORRECTION

PATENT NO. : 5,745,174
DATED : April 28, 1998
INVENTOR(S) : HIROFUMI NAKANO

It is certified that error appears in the above-identified patent and that said Letters Patent is hereby corrected as shown below:

Title page,
<u>At [56] References Cited</u>

Insert -- [30] Foreign Application Priority Data
    Apr. 12, 1994 [JP] Japan.......6-073641
    Jul. 29, 1994 [JP] Japan.......6-178571 --.

<u>At [56]</u>

Insert -- FOREIGN PATENT DOCUMENTS
    1-241511  9/1989  Japan.
    2-32312   2/1990  Japan.
    6-88936   3/1994  Japan. --.

<u>Column 5</u>

Line 64, "differences the" should read --the differences--.

<u>Column 6</u>

Line 60, "data," should read --data--.

Signed and Sealed this

Fifteenth Day of December, 1998

Attest:

BRUCE LEHMAN

*Attesting Officer*     *Commissioner of Patents and Trademarks*